(12) United States Patent
Wild et al.

(10) Patent No.: US 6,210,308 B1
(45) Date of Patent: Apr. 3, 2001

(54) APPARATUS AND METHOD FOR SEALING FOIL MATERIAL

(75) Inventors: Hans-Peter Wild, Zug (CH); Eberhard Kraft, Neckarbischofsheim (DE)

(73) Assignees: Indag GmbH & Co., Eppelheim; Betriebs-KG, Heidelberg, both of (DE)

( * ) Notice: Subject to any disclaimer, the term of this patent is extended or adjusted under 35 U.S.C. 154(b) by 0 days.

(21) Appl. No.: 09/317,366

(22) Filed: May 24, 1999

(30) Foreign Application Priority Data

Jun. 4, 1998 (DE) .............................................. 198 25 064

(51) Int. Cl.$^7$ ...................................................... B31B 49/04
(52) U.S. Cl. .......................... 493/209; 493/202; 493/203; 493/197; 493/207
(58) Field of Search .................. 493/209, 210, 493/202, 203, 206, 470, 190, 197, 207, 193, 194; 53/551, 550, 555, 258

(56) References Cited

U.S. PATENT DOCUMENTS

| 2,660,219 | | 11/1953 | Haas et al. . | |
|---|---|---|---|---|
| 3,748,205 | * | 7/1973 | Adams | 156/252 |
| 3,896,708 | * | 7/1975 | De Vries | 93/35 R |
| 4,077,308 | * | 3/1978 | Scully | 93/19 |
| 4,185,443 | * | 1/1980 | Budzyn | 53/550 |
| 4,622,798 | * | 11/1986 | Oki | 53/551 |
| 4,662,978 | * | 5/1987 | Oki | 493/203 |
| 4,994,137 | * | 2/1991 | Yanai | 493/209 |
| 5,019,027 | * | 5/1991 | Boeckmann et al. | 493/209 |
| 5,080,747 | * | 1/1992 | Veix | 156/352 |
| 5,195,435 | * | 3/1993 | Morrone et al. | 101/151 |
| 5,662,575 | * | 9/1997 | Saito et al. | 493/190 |
| 5,715,656 | * | 2/1998 | Pearce | 53/451 |

FOREIGN PATENT DOCUMENTS

| 368973 | | 11/1982 | (AT) . |
|---|---|---|---|
| 25 34 306 | * | 12/1974 | (DE) . |
| 2534306A1 | | 7/1976 | (DE) . |
| 27 00 971 | * | 12/1976 | (DE) . |
| 2700971A1 | | 8/1977 | (DE) . |
| 368973 | * | 8/1980 | (DE) . |
| 34 25 430 | * | 1/1986 | (DE) . |
| 3425430A1 | | 1/1986 | (DE) . |
| 3727339A1 | | 3/1989 | (DE) . |
| 37 27 399 | * | 3/1989 | (DE) . |
| 195 02 830 | * | 8/1996 | (DE) . |
| 19502830A1 | | 8/1996 | (DE) . |
| 29521183U1 | | 11/1996 | (DE) . |
| 295 21 183 | * | 11/1996 | (DE) . |
| 0335270A1 | | 10/1989 | (EP) . |
| WO91/18797 | | 12/1991 | (WO) . |
| WO 91/18797 | * | 12/1991 | (WO) . |

* cited by examiner

*Primary Examiner*—Stephen F. Gerrity
*Assistant Examiner*—Sam Tawfik
(74) *Attorney, Agent, or Firm*—Seed IP Law Group PLLC

(57) ABSTRACT

The present invention relates to a sealing apparatus for sealing foil material, the apparatus comprising a foil conveying means and a sealing means including a sealing head which has at least one sealing position for performing the foil sealing operation, an intermediate position in which the sealing head has a predetermined distance from the sealing position, and an inoperative position in which the sealing head has a second predetermined distance from the sealing position that is greater than the first distance. Furthermore, the invention relates to a corresponding sealing method which can be carried out with the sealing apparatus, wherein the sealing head is removed from the foil material to a first distance during the further transporation of the foil material and is removed from the foil material to a second greater distance when the foil sealing operation is interrupted.

10 Claims, 3 Drawing Sheets

APPARATUS AND METHOD FOR SEALING FOIL MATERIAL

TECHNICAL FIELD

The present invention relates to a sealing apparatus for sealing foil material, the apparatus comprising a foil conveying means and a sealing means including a sealing head, and to a method for sealing foil material.

BACKGROUND OF THE INVENTION

In a sealing apparatus for sealing foil material, two or more foils are fed to a sealing means and are there sealed together with the aid of a sealing head which is lowered onto the joined foils and transmits heat to the foils at the desired places. Insofar as sealing or sealing means is referred in the present text, this includes a hot bonding process in which an adhesive material is applied between the foils to join the foil materials by heat.

Such a sealing process is e.g. used in the production of foil bags, e.g. foil bags for beverages. Two foil materials are laid one upon the other to form the side foils of the foil bag. A bottom foil is possibly interposed in an edge portion. The foils are sealed together at two directly superimposed edges of the side foil material and at the third edge where the bottom foil is optionally positioned. The fourth edge of the respective foil materials is closed by sealing after the foil bag has been filled. An example of such a foil bag is e.g. shown in FIG. 3 where the weld seams 33 are formed in the first-described process and the weld seam 34 is formed after the foil bag has been filled.

In an automated production plant, foil webs are supplied for sealing purposes, with the webs being cut after the sealing process so as to form individual units. The foil webs are placed one upon the other and guided below the sealing head. The head is lowered. In doing so, it must cover a lowering distance of a few centimeters. After having been pressed onto the foil materials, the sealing head is again lifted and the foil webs are further transported by a distance corresponding to one foil bag before the sealing head is again lowered onto the foil material that has been transported further away. To achieve a high throughput, the sealing head is kept at a constantly high temperature to make time-consuming heating and cooling processes superfluous. Therefore, it is necessary that in the operative states in which no sealing operation takes place the sealing head should be so remote from the foil material that the foil material is not overheated or scorched. Such a distance is e.g. required in cases where the entire sealing apparatus has been stopped to eliminate a malfunction.

However, in an automated manufacturing plant, the lifting and lowering movement of the sealing head, which amounts to a few centimeters, takes an undesired long period of time at the throughput rates which are nowadays possible.

SUMMARY OF THE INVENTION

It is therefore an object of the present invention to provide a sealing apparatus and a method for sealing foil material which make it possible to lift and lower the sealing head rapidly, whereby it is ensured in every operative state that the foil material cannot be scorched or damaged.

The sealing apparatus according to an embodiment of the invention can assume at least three operative positions. The first operative position is the sealing position for performing the foil sealing operation. In this operative state the sealing head is directly positioned on the foil materials to be sealed, thereby heating and sealing or hot bonding the foil materials in those areas on which the heated surface of the sealing head is positioned. The second operative state is an intermediate position in which the sealing head has a first predetermined distance from the sealing position. The sealing head is positioned in this intermediate position while the foil material is further moved by one unit to be sealed. The third operative position is a rest or inoperative position in which the sealing head has a second predetermined distance from the sealing position that is greater than the first distance. The sealing head is in this inoperative position when the sealing apparatus does not convey the foil material at a sufficient speed to prevent overheating or scorching.

Hence, the sealing apparatus of the invention permits a short lifting and lowering operation between the sealing position and the intermediate position so that such a movement of the sealing head will not lead to any loss of time during normal operation even if the entire sealing apparatus is operated at a high speed. In case of a malfunction or at a low speed of the entire system the sealing head assumes an inoperative position which has a greater distance from the foil material so that the foil material is not damaged by the hot sealing head.

The distance of the inoperative position from the sealing position can be chosen such that damage to, e.g. scorching of, the foil material by the heat of the sealing head is considerably reduced. In a particularly advantageous development the distance between the inoperative position and the sealing position is however chosen such that the foil material can definitely not be damaged by the heat of the sealing head. It is thereby ensured that independently of the duration of the interruption or slowing down of the operation of the sealing apparatus the foil material cannot be damaged.

A particularly advantageous embodiment comprises a heat shield which in the inoperative position is moved between the hot sealing head and the foil material. Especially with particularly temperature-sensitive foil materials, such an additional shield guarantees that the foil material is not damaged by the heat of the sealing head. Such a heat shield may e.g. comprise a pivotable shield plate.

Advantageous values for the distance of the inoperative position from the sealing position are within the range of a few centimeters. This distance substantially depends on the type of foil material used, the sealing temperature and the geometry of the sealing tool used. Advantageously, a distance of a few millimeters is chosen for the distance of the sealing position from the intermediate position. Such a small distance guarantees a high throughput speed due to the short lifting path.

The sealing head can be moved in various ways, e.g. by an electromagnetic device or a corresponding spindle gear. The sealing head can easily be moved between the intermediate position and the sealing position with the help of a first pneumatic means. On account of the small distance which must be overcome, the pneumatic means only needs a very small amount of compressed air. A second pneumatic means can be used for moving the sealing head together with the first pneumatic means into the inoperative position.

The movement of the sealing head and the associated drive can e.g. be initiated mechanically. A reliable implementation is achieved with a control unit with the aid of which the conveying means is activated for further transporting the foil material while the sealing head is in the intermediate position.

BRIEF DESCRIPTION OF THE DRAWINGS

The invention shall now be explained in detail with reference to a preferred embodiment taken in conjunction with the figures, in which.

DETAILED DESCRIPTION OF THE ILLUSTRATED EMBODIMENTS

Figure 3:
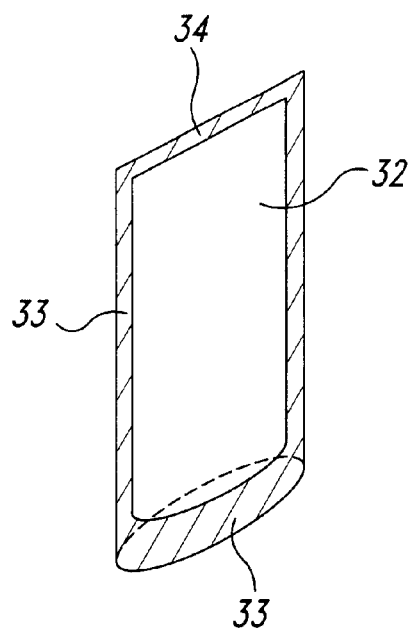
FIG. 3 shows a sealed and unclosed foil bag.

The embodiment which will be described hereinafter regards a sealing apparatus for producing foil bags, e.g. foil bags for beverages. Such a beverage foil bag is shown in FIG. 3. The foil bag 32 comprises two side foils and a bottom foil formed as a standing base. A suitable material is e.g. laminated aluminum foil. The side foils and the bottom foil are sealed together along the welds 33. Alternatively, a hot bonding operation may be performed. The top seam 34 is produced in a further processing station after the foil bag has been filled.

Figure 1:
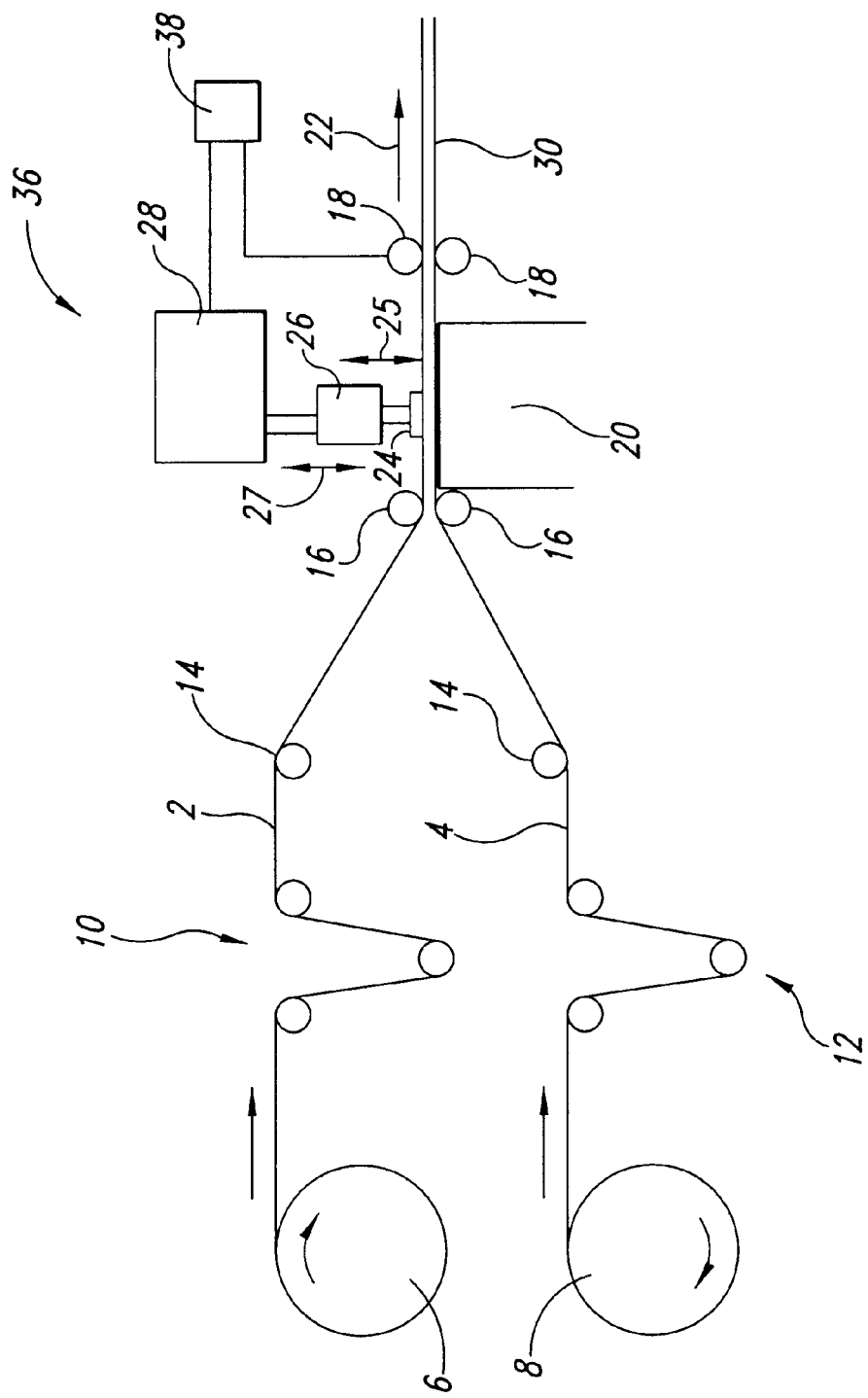
FIG. 1. is a schematic overall view of a foil sealing means according to an embodiment of the invention.

FIG. 1 is a schematic side view of a sealing apparatus of the invention used for foil bags. Reference numbers 6 and 8, designate supply rolls for feeding the foil materials. Reference numbers 10 and 12 designate respective tensioning devices which ensure a sufficient tension of the foil materials 2, 4. Reference numbers 14 and 16 designate deflection rolls while 18 designates a withdrawal means for the sealed foil material 30. Such a withdrawal means may eg. be formed by driven rollers which further transport the foil material by frictional grip. Reference number 36 designates a sealing apparatus comprising a first pneumatic means 26 acting on the sealing head 24, and a second pneumatic means 28 acting on the first pneumatic means. The movement of the sealing head 24, which is initiated by the pneumatic means 26, is represented by arrow 25 while the movement of the first pneumatic means 26, which is initiated by the pneumatic means 28, is represented by arrow 27. A control unit 38 controls the movement of the pneumatic means 26 and 28 and of the withdrawal rollers 18. The movement of the sealed foil materials 30 is indicated by arrow 22.

Figure 2A:
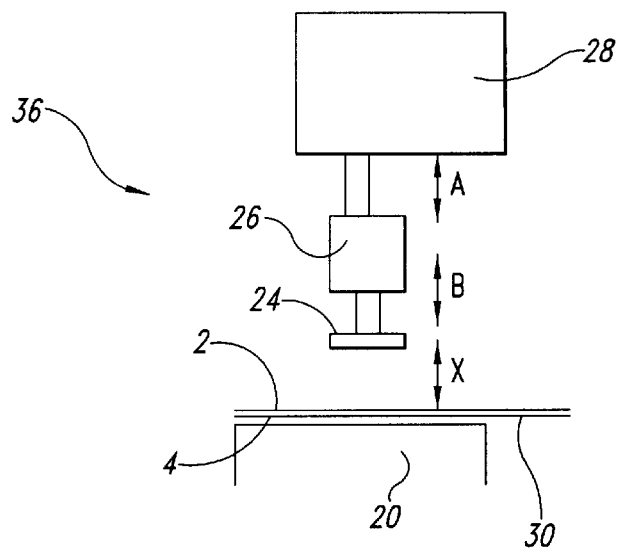
FIG. 2a is a detail view of FIG. 1, showing the sealing means in an inoperative position.

FIG. 2a is a detail view showing the sealing means 36 in the inoperative position. The distance of the sealing head 24 from the foil material is designated by x. Reference letters A and B, respectively, designate the distance of the first pneumatic means 26 from the second pneumatic means 28 and the distance of the sealing head 24 from the first pneumatic means 26.

Figure 2B:
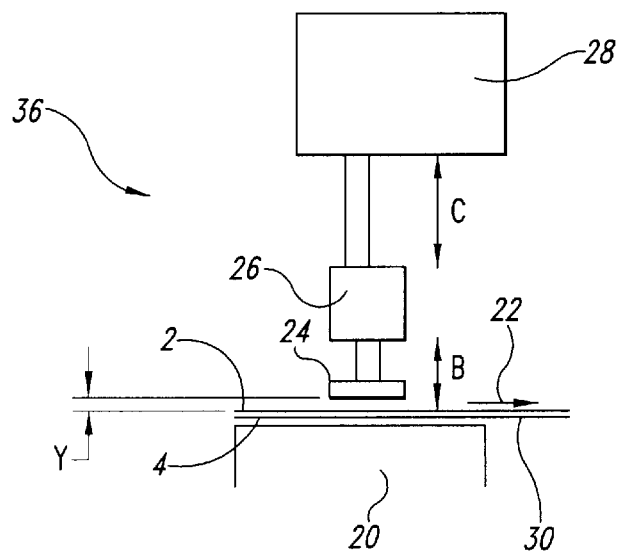
FIG. 2b is a detail view of FIG. 1, showing the sealing means in an intermediate position.

FIG. 2b shows the same sealing means 36 in the intermediate position. The distance of the sealing head 24 is designated by y, y being smaller than x. C designates the distance of the first pneumatic means 26 from the second pneumatic means 28, C being greater than A by the same amount by which x is greater than y.

Figure 2C:
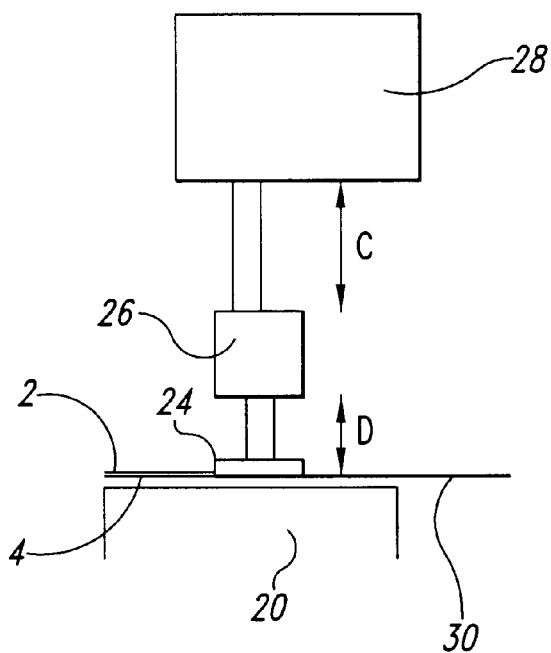
FIG. 2c is a detail view of FIG. 1, showing the sealing means in a sealing position.

FIG. 2c shows the same sealing means 36 in the sealing position. The sealing head 24 is directly positioned on the foil material. The foil materials 2 and 4 and the sealed foil material 30, respectively, are positioned on a support 20. The distance of the sealing head 24 from the pneumatic means 26 is D, D being greater than the distance B at which the sealing head 24 is spaced from the first pneumatic means 26 in the intermediate or inoperative position.

The method of the invention shall now be explained with reference to the operation of the illustrated embodiment of the sealing apparatus according to the invention. The foil materials 2 and 4 are withdrawn from the supply rolls 6 and 8, an adequate tension being maintained in a manner which is here of no interest, e.g. by spring-biased tensioning devices 10 and 12. Deflection rolls 14 and 16 unite the foil materials. The foil materials 2 and 4 which are to be sealed are intermittently moved with the aid of the withdrawal rollers 18. The distance covered during one cycle corresponds to the width of a foil bag 32. During the movement of the foil material 2, 4 and the sealed foil material 30, respectively, in direction 22, the sealing head 24 is positioned at a distance y from the foil material (see FIG. 2b). As soon as the movement of the withdrawal rollers 18 has been stopped by the control unit 38, the control unit 38 transmits a signal to the first pneumatic means 26, whereupon the distance B of the sealing head 24 from this pneumatic means 26 is increased to the distance D (see FIG. 2c). The sealing head 24 is now in direct contact with the foil materials 2, 4 to be sealed and presses said foil materials against the support 20. The head is provided in a manner which is known per se with sufficiently heated portions that effect a sealing of the foil material along the desired welds. These welds will later form the side edges and the bottom edges 33, respectively, in the example of the foil bag (FIG. 3).

After the sealing operation has been performed along the desired welds, the period of time required therefor being determinable in advance, the control unit 38 transmits a signal to the first pneumatic means 26 for lifting the sealing head 24 again, so that the distance of the sealing head 24 from the pneumatic means 26 is again B. The sealing head 24 is then in the intermediate position again. At the same time, the control unit 38 transmits a signal to the withdrawal rollers 18 to further move the foil material by one unit, e.g. the width of a foil bag 32. After this movement has been concluded, the control unit 38 transmits a stop signal to the withdrawal rollers 18 and a signal to the pneumatic means 26 to increase the distance of the sealing head 24 from the pneumatic means 26 from B to D again. In repeating these processes one obtains an intermittent operation which allows a high throughput rate, as the sealing head 24 need only be moved by the small distance y, i.e. a few millimeters. Moreover, the small height y which must be overcome just requires a small amount of compressed air for operating the pneumatic means 26.

It may become necessary for various reasons to interrupt the intermittent operation of the whole sealing apparatus. Such an interruption is e.g. required during maintenance work, checking operations or for eliminating a malfunction. During such a period it is not always necessary that the heating of the sealing head 24 should be switched off. This would be disadvantageous for energy-saving reasons and for reasons of saving time since a reheating of the sealing head requires a great amount of energy and takes a long period of time. However, while the foil conveying means is at a standstill, there is the risk that the foil material may be overheated by the hot sealing head.

To avoid possible damage to the foil material, the control unit 38 will transmit a signal to the second pneumatic means 28 when the operation of the whole sealing apparatus is interrupted. Such a signal can e.g. be triggered directly when an operator stops the transportation of the foil material, or may be triggered automatically when the foil transportation is stopped for a predetermined period of time.

The signal sent to the second pneumatic means 28 initiates a reduction of the distance C of the first pneumatic means 26 from the second pneumatic means 28 to a distance A (see FIG. 2a). The distance x of the sealing head 24 from the foil material 2, 4 and 30, respectively, is thereby increased, e.g. a few centimeters. As a result, a damaging of the foil material by the heat of the sealing head 24 is ruled out.

In cases where a particularly temperature-sensitive foil material is processed, it is possible to additionally provide a shield plate which is pivoted between the sealing head and the foil material at the same time when the second pneumatic means 28 is activated, so as to protect the foil material against the heat of the hot sealing head 24. When the sealing head 24 is again lowered from the inoperative position, the shield plate is pivoted away at the same time.

In the present embodiment the foil materials 2 and 4 are used for forming the side foils of a foil bag 32. For the sake of clarity, FIGS. 1 and 2 do not show the third supply means for the foil material of the bottom foil which is placed between the foil materials 2 and 4 and is simultaneously sealed by the sealing means 36.

Deviating from the shape of the foil bags which are processed in the above-described embodiment, the apparatus of the invention can also be used for processing foil bags in which the side foils are directly sealed to one another without an additional bottom foil. A third supply means for the foil material is not needed in such a case.

Described is an apparatus for directly sealing the foils to one another. Upon selection of a corresponding adhesive, it is also possible to perform a hot bonding or hot sealing operation with the sealing means 36.

The control unit 38 may be configured such that the inoperative position according to FIG. 2*a* is assumed not only in cases where the foil transporation is interrupted. Rather, the control unit 38 can also be designed such that at a slow rate selected for the withdrawal rollers 18 the sealing head 24 does not assume the intermediate position during further transportation of the foil material, but assumes the inoperative position shown in FIG. 2*a*. To this end, the control unit may be provided with an input means with the help of which an operator can set a minimum rate in the case of which it is only the intermediate position according to FIG. 2*b*, and not the inoperative position according to FIG. 2*a*, that is assumed while the foil is further transported away.

The sealing means 36 of the above-described embodiment implements the various positions of the sealing head with the help of two series-connected pneumatic means. It is just as well possible that a single pneumatic means with two different positions fulfills the same task.

What is claimed is:

1. A sealing apparatus for sealing foil material for producing foil bags, comprising a foil conveying means for feeding the foil material to be sealed, a sealing means including a sealing head which is movable with respect to the sealing means, a first pneumatic means configured to move the sealing head, and a second pneumatic means configured to move the sealing head and the first pneumatic means, the sealing head being controllable to be temporarily fixed in at least three operative positions:

a sealing position in which the sealing head is positioned at least proximate the foil material for performing the foil sealing operation, an intermediate position in which the sealing head has a first predetermined distance from the sealing position, and an inoperative position in which the sealing head has a second predetermined distance from the sealing position that is greater than the first distance.

2. The sealing apparatus according to claim 1 wherein the second distance is at least a few centimeters to be sufficiently large so that the foil material is not adversely affected by extended exposure to the heat of the sealing head.

3. The sealing apparatus according to claim 1 wherein the first distance is a few millimeters.

4. The sealing apparatus according to claim 1 wherein the sealing head in the intermediate position is spaced apart from the foil material to allow the foil material to be transported away.

5. The sealing apparatus according to claim 1 wherein the apparatus assumes the inoperative position when the operation of the sealing apparatus is interrupted.

6. The sealing apparatus according to claim 1 further comprising a control unit for activating the conveying means for the further transportation of the foil material to be sealed while the sealing head is in the intermediate position.

7. An apparatus for sealing together selected portions of at least a first web of a foil material and a second web of the foil material to produce a plurality of foil bags, the apparatus comprising:

a foil conveying means for feeding the first and second webs of the foil material to a sealing location at which portions of the first and second webs of foil material can be sealed together; and a sealing device having a sealing heated to a sealing temperature, the sealing temperature being sufficiently hot to seal together the first and second webs of foil material when the sealing head approaches one of the first and second webs, the sealing head being coupled to the sealing device by at least a first actuator controllable to move the sealing head with respect to the sealing device and the sealing location and to stop the sealing head in two distinct positions, the two distinct positions being a sealing position in which the sealing head approaches the foil material to seal together the first and second webs, and an intermediate position in which the sealing head is spaced apart from the foil material by a first distance, the first actuator being coupled to the sealing device by at least a second actuator controllable to move both the sealing head and the first actuator to an inoperative position in which the sealing head is spaced apart from the foil material by at least a second distance, the first distance being selected such that the sealing head is too far from the foil material to seal the foil material, but close enough to the foil material to melt the foil material after an extended period of time, the second distance being greater than the first distance and being selected such that the sealing head can be retained in the inoperative position for an extended length of time without damaging the foil material.

8. The apparatus of claim 7 wherein the first predetermined distance is approximately a few millimeters.

9. The apparatus of claim 7 wherein the second predetermined distance is approximately a few centimeters.

10. A method for rapidly sealing together portions of a first web of a foil material and a second web of the foil material for making a plurality of foil bags, and for allowing the system to be stopped for extended periods of time without damaging the foil material, the method comprising:

providing the first web of foil material layered with the second web of foil material along a path passing a sealing location;

providing a sealing device having a sealing head movably coupled thereto;

heating the sealing head to a temperature at which the first foil web is sealed to the second foil web when the sealing head approaches one of the first and second foil webs;

repeatedly moving the sealing head with a first actuator between a sealing position in which the sealing head approaches one of the first and second webs, and an intermediate position in which the sealing head is spaced apart from the first and second webs by a first distance sufficient to allow the foil material to be advanced to move a new portion of foil web to the sealing location, to rapidly seal a plurality of portions of the first and second foil webs; and selectively moving both the first actuator and the sealing head with a second actuator from one of the sealing position and the intermediate position to an inoperative position in which the sealing head is spaced apart from the foil webs by a second distance greater than the first distance and sufficient to prevent the foil material from being damaged over an extended period of time.

* * * * *

UNITED STATES PATENT AND TRADEMARK OFFICE
CERTIFICATE OF CORRECTION

PATENT NO. : 6,210,308 B1
DATED : April 3, 2001
INVENTOR(S) : Hans-Peter Wild and Eberhard Kraft It is certified that error appears in the above-identified patent and that said Letters Patent is hereby corrected as shown below:

Title page,
Item [73], Assignees, "Indag GmbH & Co., Eppelheim; Betriebs-KG, Heidelberg" should read -- INDAG GmbH & Co. Betriebs-KG, Eppelheim/Heidelberg --.

Signed and Sealed this

Nineteenth Day of February, 2002

Attest:

JAMES E. ROGAN
Attesting Officer          Director of the United States Patent and Trademark Office